United States Patent Office 2,943,071
Patented June 28, 1960

2,943,071

NON-TEAR CASE SEALING ADHESIVE

Max H. Laden, Cicero, Ill., assignor to Swift & Company, Chicago, Ill., a corporation of Illinois No Drawing. Filed Dec. 8, 1954, Ser. No. 474,008

5 Claims. (Cl. 260—27)

This invention in general relates to adhesive compositions and bonds, and more specifically, the invention relates to adhesive compositions adapted to provide a hard, brittle bond of comparatively high shear strength and relatively low tensile strength.

The adhesive of this invention finds particular application in the sealing of containers such as cartons, bags, etc., made of various paper-board stocks such as corrugated stocks, Fourdrinier stocks, jute stock, solid fiber board, etc. The adhesive bond which seals the flaps of these containers should be one of comparatively high shear strength to resist forces resulting from handling during shipment such as bending or twisting and of relatively low tensile strength to permit the flaps to be opened with ease. Bonds of many adhesives used for this purpose have a tensile strength which is higher than the fiber strength of the paper-board stock, and consequently the paper is torn upon opening the container. A number of non-fiber tearing adhesive formulations have been marketed as suitable for the purpose outlined above, but variations in bond strength with different paper-board stocks have limited their applications to one or two types of stock. For example, an adhesive formulation which is satisfactory for containers of one type of paper-board stock may give a bond which is too weak or too strong on other types of board stocks. Therefore, the tensile strength of these adhesive formulations must be adjusted for specific paper boards by the addition of ingredients such as clays, greases, plasticizers, etc. On the other hand, the adhesives of this invention upon drying form a non-fiber tearing board of low tensile strength and of relatively high shear strength on a large variety of various paper board stocks without further changes in the formulation.

It is therefore an object of this invention to provide a versatile adhesive composition which yields a non-fiber tearing bond of relatively high shear strength on a large variety of paper stocks.

A further object is to provide an adhesive composition for bonding paper board stock containers, the bond being capable of withstanding substantial shearing forces but being of sufficiently low tensile strength to provide a non-fiber-tearing bond.

A further object is to provide an adhesive composition which dries to a bond capable of withstanding a relatively high stress applied in a plane substantially parallel to the bond, and adapted for rupture of the bond film when a relatively small tensile force is applied perpendicular thereto.

Another object is to provide an adhesive composition adapted for adhering together paper or paper board stock in the form of a non-fiber-tearing bond.

Another object is to provide an adhesive bond of relatively high shear strength and comparatively low tensile strength.

A still further object is to provide a non-fiber-tearing bond having relatively high shear strength for paper or paper board stock.

Other objects not specifically enumerated herein will become apparent to one skilled in the art from the following detailed description.

The adhesive composition of this invention comprises essentially two functional ingredients—rosin or derivative thereof and a film forming material. In certain embodiments of the invention later explained, this film forming material may be omitted although in applications of the invention as adhesives for sealing containers, the film forming material is included to give additional tensile strength to the adhesive bond. I have found that aqueous dispersions of wood or gum rosin or rosin derivatives of sufficiently high melting point produce discontinuous films of good adhesion but very low tensile strength upon air drying. The tensile strength can be increased to a satisfactory level by the addition of compatible continuous film forming materials which produce a film upon drying of higher tensile strength than the rosin or rosin derivative film. The ratio of rosin or derivatives thereof to film forming material in the liquid adhesive is such that the adhesive upon drying produces a non-continuous film of the higher tensile strength material, that is broken by the rosin particles. This resultant film is generally achieved by an adhesive composition containing as the major ingredient the rosin or a derivative thereof, preferably a fraction which is substantially insoluble in light petroleum hydrocarbons such as gasoline and has a melting point by the drop method of 116° C., an acid number of 93, and a methoxy content between 5 and 6 percent or derivative of increased melting point (a drop method melting point above approximately 90° C.), and as a minor ingredient the higher tensile strength film forming material.

The derivatives of rosin previously mentioned are those which form a film having similar characteristics as the film of rosin which has not been chemically modified and have melting points equal to or greater than the unmodified rosin. These derivatives may be hydrogenated rosin, plasticized high melting point rosin, metal rosinates, etc. It is generally preferred that these derivatives or the rosin itself have a melting point equal or higher than the melting point of the rosin produced by distillation of pine chips (approximately 68° C. or higher).

Any compatible film forming material of sufficient tensile strength is adapted for use in the instant invention. It is preferred that the film forming material be water dispersible or water soluble because an aqueous medium is the preferred base for the adhesive composition. However, organic liquids may be employed as the dispersing and/or solvent medium for the solid components. Water dispersible or water soluble compositions adapted for use as the film forming ingredient include, to name a few, starches, dextrins, proteins, cellulose ethers, cellulose esters, polyvinyl alcohols, and polyvinyl acetate.

In the final formulated adhesive composition, it is often desirable, although not absolutely necessary, to include other ingredients whose function in the adhesive is apparent. A defoamer, preservative, and plasticizer may be added as minor ingredients to produce in the composition or the bond their indicated properties. Suggested additives, to name a few, include: as plasticizers, di-butyl phthalate, di-methyl phthalate, tall oil, oleic acid, and naphthenic acid; as defoamers, sulfonated oils, sulfonated tallow, dispersions of fatty acid metal soaps, silicones, di-hexyl ether, and octyl alcohol; and as preservatives, benzoic acid, sodium benzoate, phenol and ortho phenyl phenol. Caustic soda may be added to maintain the pH of the rosin dispersion on the alkaline side when acid ingredients are added and to prevent breaking the rosin dispersion. The minor ingredients provide functions which, though often desirable, are auxiliary to the main purpose of this invention to provide a bond of good adhesion and a satisfactory low level of tensile strength. Hence, the invention herein described, is not limited in any manner by the presence or absence of these minor ingredients except as specifically defined in the appended claims.

The adhesives are, in most instances, mixtures of aqueous dispersions and/or solutions. They are prepared by simple, thorough mixing of the rosin dispersion and a pre-mixture of the other ingredients. Mixtures of the above described rosin compositions and film formers in proper proportions set rapidly on porous surfaces such as paper or paper board stock and give bonds of comparatively low tensile and relatively high shear strength.

The following examples of non-fiber-tearing adhesive compositions are cited as illustrations of preferred embodiments of the herein-described invention and are not intended as such to place any limitations on the invention as defined in the appended claims.

EXAMPLE I

The following ingredients were thoroughly mixed in the proportions indicated:

|  | Percent |
|---|---|
| 40% alkaline rosin dispersion | 54.900 |
| Water | 24.615 |
| Chlorinated corn starch | 10.440 |
| Defoamer | .190 |
| 20° Bé. caustic soda | .540 |
| Preservative (o-phenyl phenol) | .360 |
| Plasticizer (tall oil) | 8.955 |
|  | 100.000 |

The water, starch, defoamer, and caustic were heated to make a starch paste. The paste was cooled whereupon the plasticizer was added. These ingredients were then mixed with the alkaline rosin dispersion, and as the last step, the preservative was added. The bond produced with the above adhesive on containers made of various paper board stocks had sufficient shear strength to withstand rough handling. When the hard, brittle bond was broken, inspection thereof showed that the board fibers were untorn.

EXAMPLE II

The following ingredients were thoroughly mixed in the proportions indicated:

|  | Percent |
|---|---|
| 20% polyvinyl alcohol solution | 17.80 |
| Plasticizer (tall oil) | 5.40 |
| Water | 9.40 |
| Defoamer | .60 |
| 40% alkaline rosin dispersion | 66.50 |
| Preservative (phenol) | .30 |
|  | 100.00 |

The plasticizer was emulsified in the aqueous polyvinyl alcohol solution, and water and defoamer added. These ingredients were mixed with the rosin dispersion, and the preservative was added. The flaps of containers made of various paper board stocks were sealed with the above adhesive. The dried bonds withstood rough handling of the containers and were easily broken by a perpendicular pull on the flaps. The fibers of the board stock showed no signs of tearing after the hard, brittle bonds were broken.

EXAMPLE III

The following ingredients were thoroughly mixed in the proportions indicated:

|  | Percent |
|---|---|
| Water | 3.90 |
| 20° Bé. caustic soda | .20 |
| 20% polyvinyl alcohol solution | 10.00 |
| Defoamer | .60 |
| 40% alkaline rosin dispersion | 85.00 |
| Preservative (phenol) | .30 |
|  | 100.00 |

An initial mixture of water, caustic, defoamer and polyvinyl alcohol solution was mixed with the rosin dispersion and the preservative added. The results of tests with containers of various paper board stocks were similar to those described in Examples I and II.

Other adhesive compositions which produced hard, brittle bonds of relatively high shear strength and comparatively low tensile strength on porous surfaces are listed in the following examples.

EXAMPLE IV

The following ingredients were thoroughly mixed in the proportions indicated:

|  | Percent |
|---|---|
| Polyvinyl alcohol solution (20%) | 23.30 |
| 45% dispersion of hard gum rosin | 42.00 |
| 40% dispersion of soft gum rosin | 28.00 |
| Water | 6.60 |
| Defoamer | .10 |
|  | 100.00 |

The aqueous polyvinyl alcohol solution, water, and defoamer were added in the proportions indicated, and the combined ingredients were mixed with the two rosin dispersions. The hard gum rosin dispersion was an aqueous alkaline dispersion of a gum rosin of high softening point, and the soft gum rosin dispersion was an aqueous alkaline dispersion of a soft gum rosin.

EXAMPLE V

The following ingredients were thoroughly mixed in the proportions indicated:

|  | Percent |
|---|---|
| Starch paste | 36.00 |
| 40% alkaline rosin dispersion | 54.00 |
| Defoamer | .10 |
|  | 100.00 |

The starch paste consisted of 23.2% chlorinated corn starch, 1.2% 20° Bé. caustic soda solution, 19.9% tall oil, 0.8% phenol and 54.8% water.

*Palletizing adhesives*

As heretofore stated, it is not always necessary to include in the adhesive formulation a film forming material of higher tensile strength than the films of the rosin dispersion. Adhesives of this nature find application as what I choose to call palletizing adhesives, i.e., adhesives used to adhere individual shipping containers, such as cartons, bags, etc., to one another when they are stacked. The bonding of the containers in the form of palletized units prevents the containers from sliding off during transport. Upon unloading, the bonds must break easily without damage to the containers. The wood rosin, gum rosin or derivatives thereof have sufficient shear strength to withstand pressures or sudden forces against the sides of the containers, and inasmuch as a relatively lower tensile strength is desired is palletizing adhesives than in the non-fiber-tearing adhesives described above, other film forming materials of higher tensile strength are omitted. Unlike the carton sealing adhesives, it is important that palletizing adhesive bonds be colorless to avoid unattractive markings on the exterior surface of the container.

Adhesives prepared according to my invention consist of mixtures of alkaline dispersions of high melting point rosins or rosin derivatives, and alkaline dispersions of low melting rosins or rosin derivatives or plasticizers. These compositions produced transparent, nearly colorless non-fiber-tearing bonds on all paper bags and paper board cartons tested.

The solids ratio of hard rosin to soft rosin may vary from about 70:30 to 50:50, and the solids ratio of hard rosin to plasticizer from about 95:5 to 85:15. The plasticizer may be any composition which is compatible with and imparts plasticity to the hard rosin film. The plasticizers enumerated elsewhere in this description are effective in this embodiment of the invention. The soft rosin, besides having film forming properties, is a plasticizer in the mixture of hard and soft rosins. The function of the plasticizer is the coalescence of higher melting rosin particles to increase the tensile strength of the rosin film. The hard rosin is a high melting rosin having a drop method melting point above 90° C. as previously described, and the soft rosin has a drop method melting point below 90° C.

The following example is an illustration of an embodiment of a palletizing adhesive.

EXAMPLE VI

The following ingredients were thoroughly mixed in the proportions indicated:

| | Percent |
|---|---|
| 45% dispersion of hard gum rosin | 59.90 |
| 40% dispersion of soft gum rosin | 40.00 |
| Defoamer | .10 |
| | 100.00 |

The rosin dispersions are the same as described in Example IV.

Thus, the present invention comprises several embodiments of an adhesive containing a rosin or rosin derivative, said adhesive adapted to produce a bond of relatively high shear strength and comparatively low tensile strength. The adhesive compositions, while particularly described as useful for sealing paper or paper board stock, are adapted for adhering together other porous surfaces.

Obviously, many modifications and variations of the invention as hereinbefore set forth may be made without departing from the spirit and scope thereof, and therefore only such limitations should be imposed as are indicated in the appended claims.

I claim:

1. A noncontinuous film-forming adhesive composition adapted to secure paperboard stock with a hard, brittle bond having the characteristics of high shear strength and low tensile strength, consisting essentially of an aqueous alkaline dispersion of a resin selected from the group consisting of rosin, hydrogenated rosin, and mixtures thereof, said resin having a drop melting point above approximately 68° C., and a material selected from the group consisting of polyvinyl alcohol and chlorinated starch, the proportion of ingredients being from about 2 to about 17 parts by weight resin to 1 part said material.

2. The composition of claim 1 wherein the material is polyvinyl alcohol.

3. The composition of claim 1 wherein the material is chlorinated starch.

4. The composition of claim 1 wherein the proportion of ingredients is from about 7.5 to about 17 parts by weight resin to 1 part said material.

5. A noncontinuous film-forming adhesive composition adapted to secure paperboard stock with a hard, brittle bond having the characteristics of high shear strength and low tensile strength, consisting essentially of an aqueous alkaline dispersion of rosin and chlorinated starch, the proportion of said ingredients being about 2 parts by weight rosin to 1 part chlorinated starch.

References Cited in the file of this patent

UNITED STATES PATENTS

| | | |
|---|---|---|
| 1,311,965 | Grosvenor | Aug. 5, 1919 |
| 1,722,776 | Weber | July 30, 1929 |
| 1,815,444 | Moss | July 21, 1931 |
| 2,238,776 | Kleinicke | Apr. 15, 1941 |
| 2,277,259 | Schnabel et al. | Mar. 24, 1942 |
| 2,343,308 | Little | Mar. 7, 1944 |
| 2,430,987 | Lindner | Nov. 18, 1947 |
| 2,435,909 | Tompkins | Feb. 10, 1948 |
| 2,613,156 | McGaffin et al. | Oct. 7, 1952 |

OTHER REFERENCES

Oswald: Trends in the Development of Rosin-Base Resins, Official Digest of Phila. Paint and Varnish Production Club, October 1944, pages 458–473.